UNITED STATES PATENT OFFICE.

DANIEL J. KYTE, OF PHILADELPHIA, PENNSYLVANIA.

BITTERS.

SPECIFICATION forming part of Letters Patent No. 330,496, dated November 17, 1885.

Application filed October 5, 1885. Serial No. 179,036. (No specimens.)

*To all whom it may concern:*

Be it known that I, DANIEL J. KYTE, a citizen of the United States, residing at Philadelphia, in the county of Philadelphia and State of Pennsylvania, have invented a certain new and useful Medical Compound for the Treatment and Cure of Dyspepsia; and I do hereby declare the following to be a full, clear, and exact description of the invention, such as will enable others to make and use the same.

My composition consists of the following-named ingredients, prepared in the manner hereinafter described: ground calamus-root, five pounds; ground coriander-seed, five pounds; ground juniper-berries, five pounds; ground ginger, one and one-fourth pound; ground cinnamon, one and one-fourth pound; powdered Cape aloes, eleven pounds eleven ounces; alcohol, six gallons; water, eight gallons. The above ingredients are put into a twenty-five-gallon churn, which is then made as near air-tight as possible, and allowed to remain therein for forty-eight hours, the mass being agitated by the movement of the churn-paddles for about one minute every hour. At the expiration of the forty-eight hours the liquid is drawn off and the herbs taken out and put in a coarse muslin bag or cloth, after which they are subjected to pressure to squeeze out the remaining liquid. The liquid first drawn off and that obtained by pressing the herbs are then poured together in a suitable vessel, tightly sealed, and allowed to settle for about forty-eight hours, when the clear liquid is poured off into bottles and corked up for use.

When first commencing to use this medicine, it is given in tea-spoonful doses one hour after each meal. This amount is gradually increased until a table-spoonful is taken at one time, this being the full dose for an adult, and it should produce a movement of the bowels about four times every twenty-four hours. Should the patient be constipated and the bowels not be moved four times in twenty-four hours, a small quantity of powdered aloes is added to the medicine—say about five grains to a seven-ounce bottleful of the mixture. If this should not have the desired effect an additional five grains of aloes is added, and so on until thirty-five grains of aloes have been put into a seven-ounce bottleful of the prepared medicine.

In order that the medicine may have the proper effect, no food or drink should be taken for at least one hour before taking the medicine and for one hour and a half after taking.

Having thus described my invention, what I claim as new, and desire to secure by Letters Patent of the United States, is—

The herein-described compound, consisting of the following ingredients, in about the proportions specified, to wit: calamus-root, coriander-seed, juniper-berries, ginger, cinnamon, aloes, alcohol, and water, as and for the purpose described.

In testimony whereof I affix my signature in presence of two witnesses.

DANIEL J. KYTE.

Witnesses:
   THOMAS D. MOWLDS,
   OTIS EGAN.